(No Model.)
T. BOWER.
TREE PROTECTOR.
No. 258,701. Patented May 30, 1882.
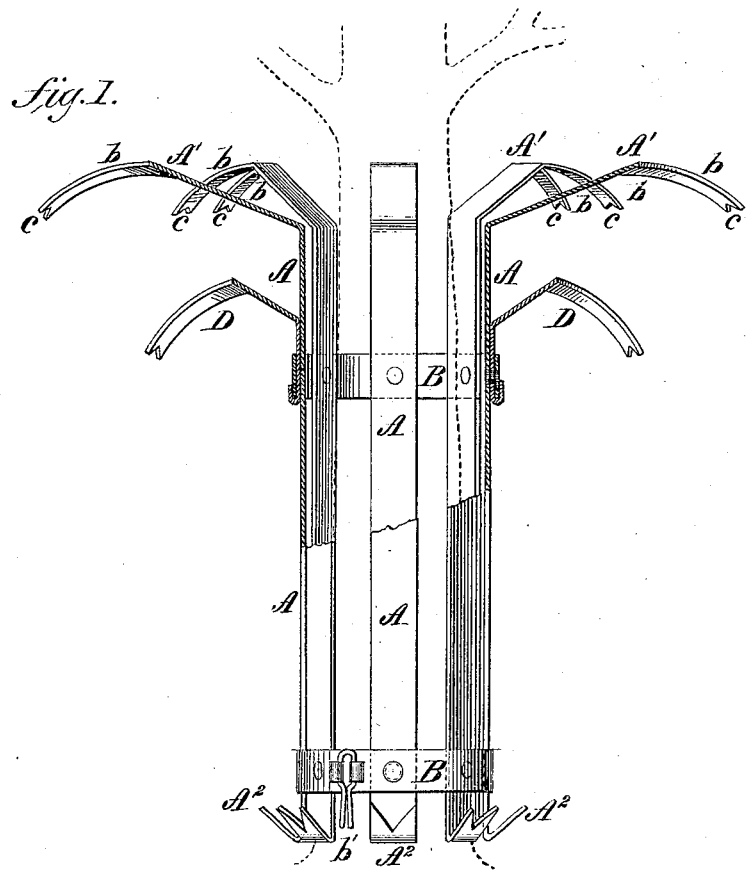
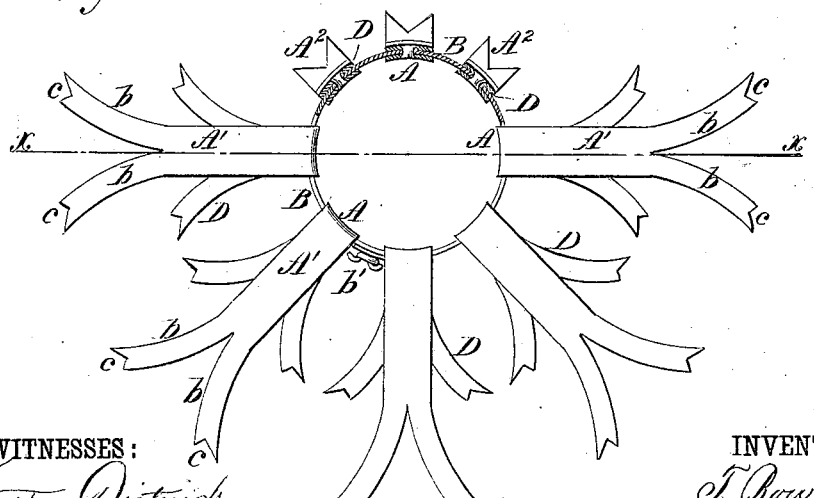
WITNESSES:
INVENTOR:
T. Bower
BY Munn & Co.
ATTORNEYS.

UNITED STATES PATENT OFFICE.

THOMAS BOWER, OF WATERBURG, NEW YORK.

TREE-PROTECTOR.

SPECIFICATION forming part of Letters Patent No. 258,701, dated May 30, 1882.

Application filed April 1, 1882. (No model.)

*To all whom it may concern:*

Be it known that I, THOMAS BOWER, of Waterburg, in the county of Tompkins and State of New York, have invented a new and useful Improvement in Tree-Protectors, of which the following is a full, clear, and exact description.

Reference is to be had to the accompanying drawings, forming part of this specification, in which similar letters of reference indicate corresponding parts in both the figures.

Figure 1 represents a partly broken and sectional elevation of a tree-protector constructed in accordance with my invention and as applied to a tree, (shown in part by dotted lines,) the sectional portion of the figure being taken mainly on the line $x\ x$ in Fig. 2. Fig. 2 is a partly-sectional plan of the same.

The invention consists in slats set in a circle at a short distance apart, held together by bands, and provided with bent barbed extensions having split branches spread apart and notches at the outer ends, as hereinafter described.

In the drawings, A A represent a series of uprights or slats, with intermediate spaces to admit the light and air, arranged to encircle the body or trunk of the tree for a limited distance from the ground, and held or bound together by upper and lower elastic wires or bands, B. Said uprights or slats terminate above in long outwardly-bent barbed extensions A' A', made by splitting the upper bent or overhanging portions of said uprights, spreading said split continuations or branches $b\ b$ thereof apart, and notching the outer ends thereof, as at $c\ c$. Such uprights, with their bent or drooping barbed extensions, may be made either wholly of iron or steel, or their straight portions may be of wood and their barbed extensions or continuations of metal. The protection which the long elastic barbed portions A' A', with their spread and notched branches, afford renders it impossible for hogs or sheep to reach up or over and injure the limbs of the tree, and there is no danger of the animals being cut or the fleece of sheep becoming damaged by being pulled out, as is the case when barbs of a rigid construction are used.

The lower ends of the uprights or slats A A are also constructed or provided with outer bent and turned-up barbed or notched portions $A^2\ A^2$, which prevent hogs from raising up the protector with their noses.

The long elastic barbed extensions A' A' on top of the protector admit of the protector being made of a reduced height without impairing its adaptability to low and irregular branching trees. Around the upper portion of the protector, beneath the bent barbs or barbed extensions A' A' may be arranged an additional series of outwardly-bent elastic barbs or split, spread, and notched extensions, D D, to rest on the outside of the uprights A A. These extensions are secured by the same upper wire or band, B, that holds said uprights in place, by bending their lower ends over the lower edges of said band and securing the whole together by a single rivet through each upright; but these additional barbed projecting devices may be very generally dispensed with, thus reducing expense.

Protectors constructed as described may be made to fit any-sized tree, and, if necessary, two or more may be used in conjunction, mounted one upon the other. They are easy of adjustment and may be very readily secured in position.

The ends of the bands B may be united by means of outer eyes or loops on either end of it, and a doubled wire passed through said loops and afterward bent to prevent its removal from the loops, as shown at $b'$ on the lower band in Fig. 1.

For large trees any number of these protectors may be arranged around the tree and be coupled together.

I am aware that it is not broadly new to provide a metallic tree-protector with sharp downwardly-projecting spurs; but

What I claim as new is—

A tree-protector having a number of slats arranged at a short distance apart in a circle, held together by the bands B, and provided with the bent barbed extensions A', said extensions being split branches spread apart and notched at the outer ends, as shown and described.

THOMAS BOWER.

Witnesses:
ABRAHAM V. VAN LIEW,
ERASTUS GAY.